United States Patent [19]

Sommerer

[11] Patent Number: 5,062,655
[45] Date of Patent: Nov. 5, 1991

[54] WHEEL SUSPENSION SYSTEM HAVING A LOWER BEARING WITH TWO BALL JOINTS

[75] Inventor: Karl Sommerer, Wiernsheim, Fed. Rep. of Germany

[73] Assignee: Dr.Ing.h.c.F. Porsche Aktiengesellschaft, Fed. Rep. of Germany

[21] Appl. No.: 609,635

[22] Filed: Nov. 6, 1990

[30] Foreign Application Priority Data

Nov. 20, 1989 [DE] Fed. Rep. of Germany ....... 3938475

[51] Int. Cl.$^5$ .............................................. B60G 7/00
[52] U.S. Cl. .................... 280/674; 280/675; 280/688; 280/96.3; 403/56; 403/131
[58] Field of Search ....................... 280/96.3, 691, 660, 280/672-675, 693, 688; 403/131, 128, 56

[56] References Cited

U.S. PATENT DOCUMENTS 3,061,329 10/1962 Hintzen ................................ 280/672

FOREIGN PATENT DOCUMENTS 0253383 1/1988 European Pat. Off. ............ 280/675
0870789 6/1961 United Kingdom ................ 280/693

Primary Examiner—Charles A. Marmor
Assistant Examiner—Paul Dickson
Attorney, Agent, or Firm—Evenson, Wands, Edwards, Lenahan & Mckeown

[57] ABSTRACT

A wheel suspension system, particularly a front wheel suspension system for a motor vehicle, having upper and lower wheel suspension members which are hinged to the wheel carrier and guide it around a turning swivel axis. The lower wheel suspension member and a spring strut are supported in a hinged manner in lower joints of a common bearing element of the wheel carrier. The swivel axis, which is guided through the wheel-carrier-side joint of the upper wheel suspension member, extends through the center axis of the upper joint and of the lower bearing element.

10 Claims, 2 Drawing Sheets

WHEEL SUSPENSION SYSTEM HAVING A LOWER BEARING WITH TWO BALL JOINTS

BACKGROUND AND SUMMARY OF THE INVENTION

The invention relates to a wheel suspension system of the type in which a wheel carrier element is supported by upper and lower controls arms coupled thereto by ball joint bearing elements.

British Patent No. 2,176,158, discloses a wheel suspension system of the generic type having an upper and lower control arm which are linked to the wheel carrier by bearings. Another bearing is provided for the lower supporting point of the spring strut on the wheel carrier, which is displaced toward the interior in the direction of the longitudinal center axis of the vehicle. Wheel turning takes place by way of a turning axis extending through the joints of the two wheel control arms, the lower supporting point for the spring strut being arranged at a distance to the lower control arm point, which contributes to a disadvantageous formation of torque during a turning of the wheel.

It is therefore an object of the present invention to provide a wheel suspension system which has a small disturbing-force lever arm while the damper transmission is optimal, and in which the lower wheel suspension control arm and suspended joint are free from spring forces exerted by the spring strut.

This object is achieved according to the invention by positioning of the control-arm-side hinge points within the rim of the wheel, and close to its perpendicular longitudinal center plane. These joints, arranged above one another, are held in the wheel carrier and are situated in a wheel turning axis extending through the joint of the upper wheel suspension member. The joint of the lower control arm is constructed as a suspended joint and is provided separately from the stationary joint of the spring strut. As a result, the suspended joint for the lower control arm is free of spring forces and thus can be designed in a more defined and safer manner. In addition, the lower control arm can be built more easily because it is free of spring forces and acts only as a tension and pressure strut.

The principal advantages of the invention are that it achieves a large support base (and thus an optimal damper ratio), and results in a lower disturbing-force lever arm to which the joints for the lower control arm and the spring strut arranged in the bearing element of the wheel carrier contribute jointly.

Other objects, advantages and novel features of the present invention will become apparent from the following detailed description of the invention when considered in conjunction with the accompanying drawings.

DETAILED DESCRIPTION OF THE DRAWINGS

Figure 1:
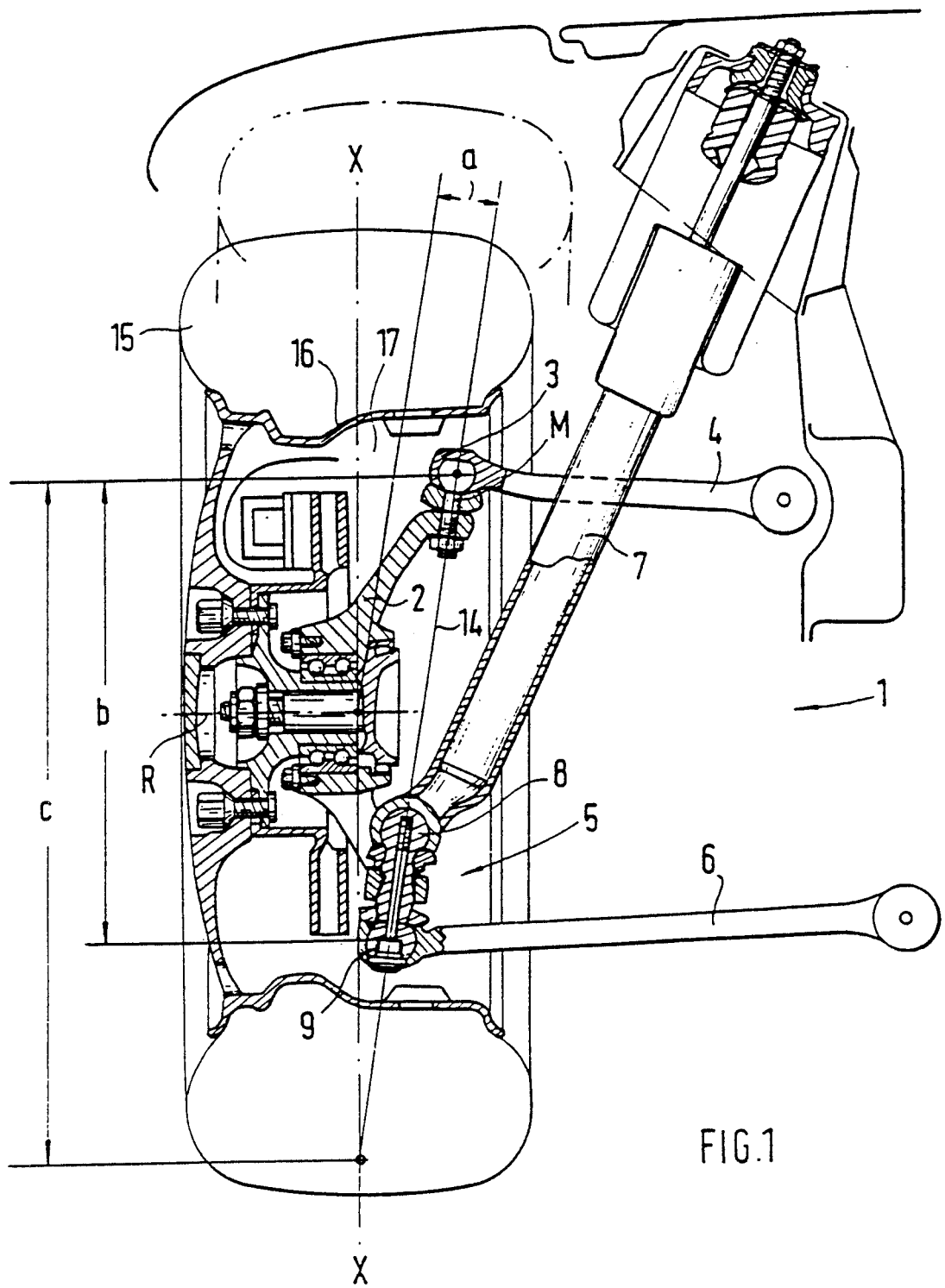
FIG. 1 is a frontal view of a wheel suspension system having two control arms and one spring strut.

Referring to FIG. 1, the wheel suspension system 1 comprises an upper control arm 4 connected with the wheel carrier 2 by way of a joint 3, as well as a lower control arm 6 held in a bearing element 5 in which a spring strut 7 is at the same time supported at its lower end.

The bearing element 5 comprises a first stationary bearing 8 for the spring strut 7, and a second suspended bearing 9 for the lower control arm 6.

Figure 2:
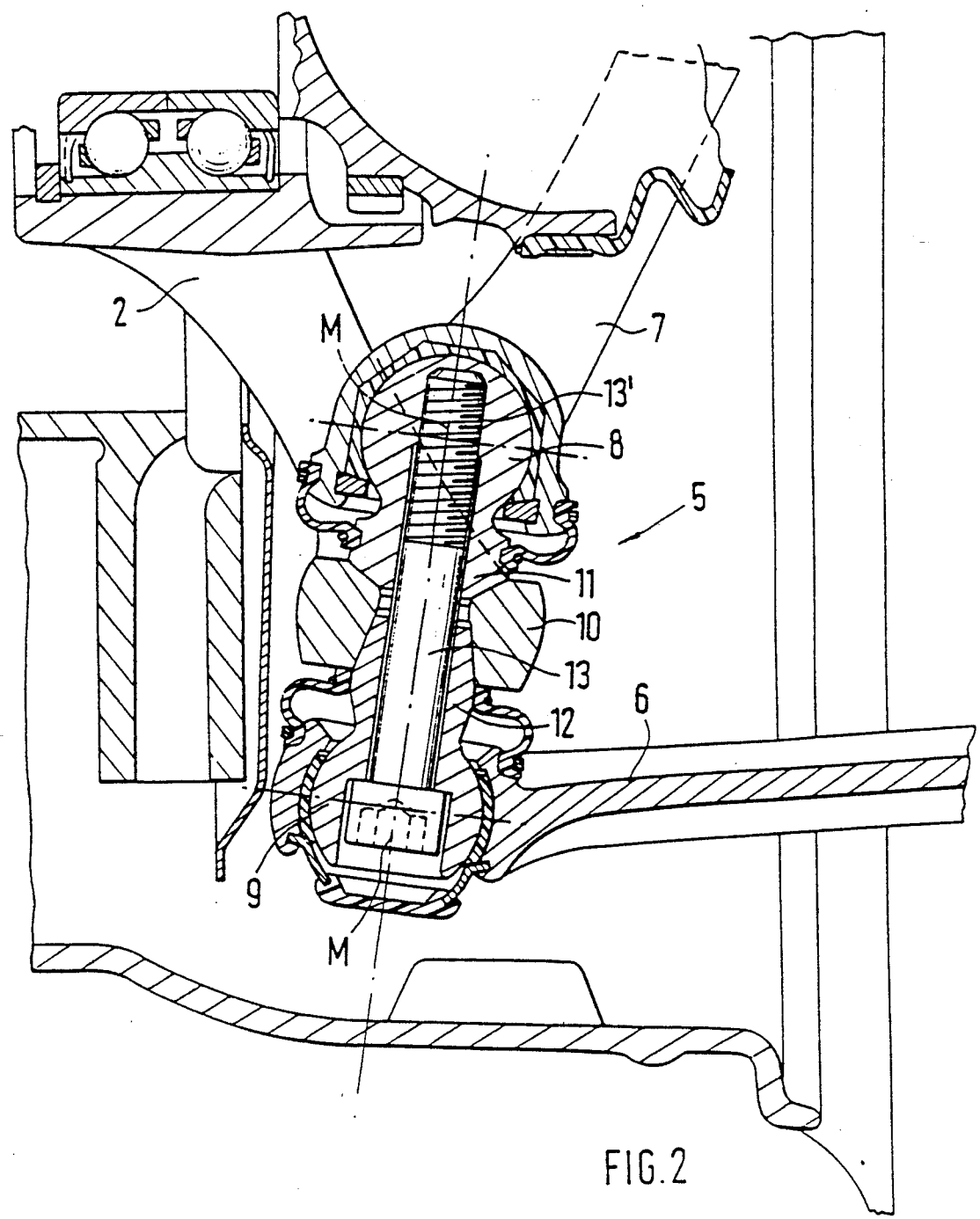
FIG. 2 is an enlarged representation of a bearing element for the hinged support of a lower control arm and a spring strut.

As best shown if FIG. 2, bearings 8 and 9 comprise ball joints and are supported in a ring 10 of the wheel carrier 2. For this purpose, the ball joints 8 and 9 have necks 11 and 12, which are constructed in a conically tapered manner and are fitted into corresponding receiving apertures of the ring 10. Ball joints 8 and 9 are fastened in the ring 10 by threaded pin 13 which, by means of thread 14, can be screwed into the stationary ball joint 8 and is supported by means of its head in the ball joint 9.

The ball joints 8 and 9 of the bearing element 5 are arranged such that the turning axis 14 of the wheel 15 extends through the center axis M of the joint 3 of the upper control arm 4, which also extends through the center of the joints 8 and 9 of the bearing element 5 as well as of the spring strut. Because the joints 3, 8 and 9 that are arranged in close proximity to the perpendicular longitudinal center plane X—X of the wheel, the swivel axis 14 can form only a small disturbing-force lever arm, with the distance a Furthermore, as a result of the position of the joints 3, 8 and 9 within the disk 17 of the rim 16, a relatively large supporting base with the distance b is achieved, whereby an optimal damper ratio b/c is obtained which amounts to <0.9.

The joint 9 for the lower control arm 6 is separated from the joint 8 for the spring strut so that the lower joint is free of supporting forces of the spring strut 7 and may thus be dimensioned to be lighter, and is safely protected from failure.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A wheel suspension system, particularly a front-wheel suspension system for a motor vehicle, comprising: a wheel carrier; a spring strut; upper and lower wheel suspension members linked to said wheel carrier by upper and lower bearing elements and guiding said wheel carrier around a turning axis; said lower bearing element comprising at least two joints, said spring strut being supported in a hinged manner in a joint of said lower bearing element, and said turning axis extending through a center axis of said upper bearing element and through joints of the lower bearing element.

2. A wheel suspension system according to claim 1, wherein the lower bearing element comprises two separate lower ball joints which are held in a supporting ring of the wheel carrier by way of a screw.

3. A wheel suspension system according to claim 2, wherein the one of said lower joints is coupled to the lower wheel suspension member and is constructed as a suspended joint.

4. A wheel suspension system according to claim 3, wherein the other of said lower joints of the spring strut is constructed as a stationary joint.

5. A wheel suspension system according to claim 1, wherein the upper and lower joints are arranged inside a wheel disk formed by a wheel rim, close to a perpendicular longitudinal center plane of a vehicle wheel, and have a support base which corresponds approximately to the inside diameter of the wheel rim.

6. A wheel suspension system according to claim 2, wherein the upper and lower joints are arranged inside a wheel disk formed by a wheel rim, close to a perpendicular longitudinal center plane of a vehicle wheel, and have a support base which corresponds approximately to the inside diameter of the wheel rim.

7. A wheel suspension system according to claim 4, wherein the upper and lower joints are arranged inside a wheel disk formed by a wheel rim, close to a perpendicular longitudinal center plane of a vehicle wheel, and have a support base which corresponds approximately to the inside diameter of the wheel rim.

8. A wheel suspension system according to claim 1, wherein the spring strut has a damper ratio of $<0.9$.

9. A wheel suspension system according to claim 2, wherein the spring strut has a damper ratio of $<0.9$.

10. A wheel suspension system according to claim 4, wherein the spring strut has a damper ratio of $<0.9$.

* * * * *